US012658698B2

(12) United States Patent　　　　　　(10) Patent No.:　　US 12,658,698 B2
Fujii et al.　　　　　　　　　　　　　　(45) Date of Patent:　　　Jun. 16, 2026

(54) CONTROL DEVICE AND POWER CONVERSION DEVICE

(71) Applicant: Mitsubishi Electric Corporation, Tokyo (JP)

(72) Inventors: Toshiyuki Fujii, Tokyo (JP); Kaho Mukunoki, Tokyo (JP); Hiroki Ishihara, Tokyo (JP); Ryosuke Uda, Tokyo (JP); Kota Hamanaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 391 days.

(21) Appl. No.: 18/564,740

(22) PCT Filed: Jun. 23, 2021

(86) PCT No.: PCT/JP2021/023816

§ 371 (c)(1),
(2) Date: Nov. 28, 2023

(87) PCT Pub. No.: WO2022/269811

PCT Pub. Date: Dec. 29, 2022

(65) Prior Publication Data

US 2024/0275165 A1　　　Aug. 15, 2024

(51) Int. Cl.
H02J 3/00　　　　(2026.01)
H02H 3/08　　　　(2006.01)
H02J 103/30　　　(2026.01)

(52) U.S. Cl.
CPC ................ H02J 3/00 (2013.01); H02H 3/08 (2013.01); H02J 2103/30 (2026.01)

(58) Field of Classification Search
CPC .. H02J 3/00; H02J 2103/30; H02J 3/32; H02J 3/40; H02H 3/08; H02M 1/0009; H02M 1/32; H02M 7/5395; H02M 7/797
See application file for complete search history.

(56) References Cited

U.S. PATENT DOCUMENTS

2016/0006338 A1　　1/2016　Sakimoto et al.
2017/0207698 A1*　7/2017　Kuboyama ........... H02J 3/0014
(Continued)

FOREIGN PATENT DOCUMENTS

JP　　2014168351 A　　9/2014
JP　　2018137925 A　　8/2018
JP　　2020025394 A　　2/2020

OTHER PUBLICATIONS

International Search Report (PCT/ISA/210) with translation and Written Opinion (PCT/ISA/237) mailed on Sep. 7, 2021 by the Japanese Patent Office as the International Searching Authority for International Application No. PCT/JP2021/023816. (8 pages).

*Primary Examiner* — Rami Khatib
(74) *Attorney, Agent, or Firm* — BUCHANAN INGERSOLL & ROONEY PC

(57)　　　　　　ABSTRACT

A control device includes a generator simulating unit to generate a phase of output voltage of a power converter by simulating characteristics of a synchronous generator, a first voltage command generating unit to generate a first voltage command value of output voltage of the power converter so that an AC voltage of a power grid attains a target voltage, a setting unit to set an overcurrent level, and a second command generating unit to generate a second voltage command value by limiting the first voltage command value based on the overcurrent level. The control device further includes a signal generating unit to generate a control signal for the power converter, based on the phase generated by the generator simulating unit and the second voltage command value.

20 Claims, 6 Drawing Sheets

(56) References Cited

U.S. PATENT DOCUMENTS

| | | | |
|---|---|---|---|
| 2023/0170782 A1* | 6/2023 | Narita ..................... | H02J 3/381 |
| | | | 363/56.12 |
| 2025/0192660 A1* | 6/2025 | Uemura ................ | H02M 1/325 |
| 2025/0357761 A1* | 11/2025 | Hamanaka ................ | H02J 3/38 |

* cited by examiner

| OVERCURRENT LEVEL | LIMIT VALUE $|Imax|$ | GAIN Kd |
|---|---|---|
| LEVEL 1a | $|Imax1a|$ | Kd1a |
| LEVEL 1b | $|Imax1b|$ | Kd1b |
| LEVEL 2 | $|Imax2|$ | Kd2 |
| LEVEL 3 | $|Imax3|$ | Kd3 |
| ~ | ~ | ~ |
| LEVEL N | $|ImaxN|$ | KdN |

FIG.6

| OVERCURRENT LEVEL | AT TIME OF LEVEL INCREASE | | AT TIME OF LEVEL DECREASE | |
|---|---|---|---|---|
| LEVEL 1a | $|Icn|<I1$ | $V1<|Vsys|$ | $|Icn|<I1-Ig$ | $V1+Vg<|Vsys|$ |
| LEVEL 1b | $|Icn|<I1$ | $V1<|Vsys|$ | $|Icn|<I1-Ig$ | $V1+Vg<|Vsys|$ |
| LEVEL 2 | $I1\leq|Icn|<I2$ | $V2<|Vsys|\leq V1$ | $I1-Ig\leq|Icn|<I2-Ig$ | $V2+Vg<|Vsys|\leq V1+Vg$ |
| LEVEL 3 | $I2\leq|Icn|<I3$ | $V3<|Vsys|\leq V2$ | $I2-Ig\leq|Icn|<I3-Ig$ | $V3+Vg<|Vsys|\leq V2+Vg$ |
| $\sim$ | $\sim$ | $\sim$ | $\sim$ | $\sim$ |
| LEVEL N | $I(N-1)\leq|Icn|$ | $|Vsys|\leq V(N-1)$ | $I(N-1)-Ig\leq|Icn|$ | $|Vsys|<V(N-1)+Vg$ |

CONTROL DEVICE AND POWER CONVERSION DEVICE

TECHNICAL FIELD

The present disclosure relates to a control device and a power conversion device.

BACKGROUND ART

In recent years, many distributed power sources using renewable energy such as photovoltaic power systems have been introduced to power grids. Distributed power sources are often connected to a power grid through a power converter. Therefore, as the number of distributed power sources connected to a power grid increases, the proportion of synchronous machines connected to the power grid decreases and the inertia energy in the power grid decreases. Virtual synchronous machine control has been proposed, which allows a power converter to behave similarly to a synchronous machine and thereby makes up for the decreased inertia energy.

The power converter with virtual synchronous machine control (hereinafter also referred to as "virtual synchronous machine) is controlled so as to simulate the behavior of a synchronous generator to be simulated being connected to a power grid. The behavior of a synchronous generator to be simulated is implemented by solving the swing equation. For example, Japanese Patent Laying-Open No. 2018-137925 (PTL 1) discloses a single-phase pseudo synchronization inverter that does not have a multi-loop of a current control system and a voltage control system.

CITATION LIST

Patent Literature

PTL 1: Japanese Patent Laying-Open No. 2018-137925

SUMMARY OF INVENTION

Technical Problem

A voltage control-type virtual synchronous machine operates as a voltage source by controlling a voltage and therefore is unable to control current. For this reason, when a short-circuit fault or the like occurs in a grid, a power converter may stop due to overcurrent. The controller for an inverter according to PTL 1 is provided with an overcurrent protection unit for protecting an inverter from overcurrent. The overcurrent protection unit is configured to output a protection signal that is a constant multiple of a deviation between an output current command value limited by a limiter and an alternating current waveform when overcurrent is detected. However, the upper limit and the lower limit of the limiter and the constant are fixed, and overcurrent suppression is unable to be performed flexibly according to the magnitude of overcurrent.

An object in an aspect of the present disclosure is to provide a control device and a power conversion device capable of flexibly performing overcurrent suppression while performing control of simulating a synchronous generator for a power converter.

Solution to Problem

According to an embodiment, a control device for a power converter that performs power conversion between a power storage element and a power grid is provided. The control device includes a generator simulating unit to generate a phase of output voltage of the power converter by simulating characteristics of a synchronous generator, a first command generating unit to generate a first voltage command value of output voltage of the power converter so that an AC voltage of the power grid attains a target voltage or so that a reactive power of the power grid attains a target reactive power, a setting unit to set an overcurrent level of an output current of the power converter, based on at least one of the output current and the AC voltage of the power grid, and a second command generating unit to generate a second voltage command value of output voltage of the power converter by limiting the first voltage command value based on the overcurrent level. The second command generating unit includes a filter to extract a fundamental frequency component of the output current, a limiter to limit an amplitude of the fundamental frequency component, using a limit value corresponding to the overcurrent level, a first calculating unit to calculate a multiplication value of a deviation between an output value of the limiter and the output current and a gain corresponding to the overcurrent level, and a second calculating unit to calculate the second voltage command value by adding the first voltage command value and the multiplication value. The control device further includes a signal generating unit to generate a control signal for the power converter, based on the phase generated by the generator simulating unit and the second voltage command value.

A power conversion device according to another embodiment includes a power converter to perform power conversion between a power storage element and a power grid, and a control device for the power converter. The control device includes a generator simulating unit to generate a phase of output voltage of the power converter by simulating characteristics of a synchronous generator, a first voltage command generating unit to generate a first voltage command value of output voltage of the power converter so that an AC voltage of the power grid attains a target voltage or so that a reactive power of the power grid attains a target reactive power, a setting unit to set an overcurrent level of an output current of the power converter, based on at least one of the output current and the AC voltage of the power grid, and a second voltage command generating unit to generate a second voltage command value of output voltage of the power converter by limiting the first voltage command value based on the overcurrent level. The second voltage command generating unit includes a filter to extract a fundamental frequency component of the output current, a limiter to limit an amplitude of the fundamental frequency component, using a limit value corresponding to the overcurrent level, a first calculating unit to calculate a multiplication value of a deviation between an output value of the limiter and the output current and a gain corresponding to the overcurrent level, and a second calculating unit to calculate the second voltage command value by adding the first voltage command value and the multiplication value. The control device further includes a signal generating unit to generate a control signal for the power converter, based on the phase generated by the generator simulating unit and the second voltage command value.

Advantageous Effects of Invention

According to the present disclosure, overcurrent suppression can be performed flexibly while performing control of simulating a synchronous generator for a power converter.

BRIEF DESCRIPTION OF DRAWINGS

FIG. 5 is a diagram showing examples of a limit value and a gain corresponding to an overcurrent level.

FIG. 6 is a diagram illustrating an example of a method of setting an overcurrent level.

DESCRIPTION OF EMBODIMENTS

Embodiments will be described below with reference to the drawings. In the following description, like parts are denoted by like signs. Their names and functions are also the same. A detailed description thereof will not be repeated.
<Overall Configuration>

Figure 1:
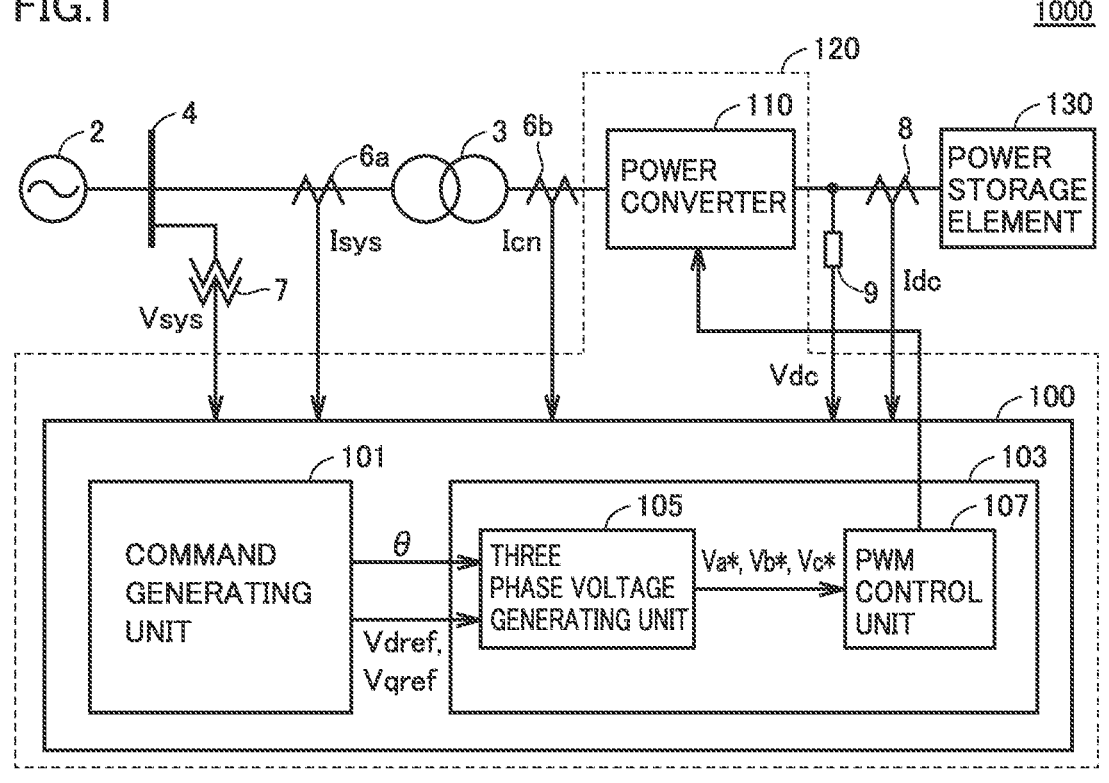
FIG. 1 is a diagram illustrating an exemplary overall configuration of a power conversion system.

FIG. 1 is a diagram illustrating an exemplary overall configuration of a power conversion system. A power conversion system 1000 includes a power grid 2, a transformer 3, AC current detectors 6a and 6b, an AC voltage detector 7, a DC current detector 8, a DC voltage detector 9, a power conversion device 120, and a power storage element 130. Power conversion device 120 includes a control device 100 and a power converter 110. Power converter 110 is connected to an interconnection point 4 of power grid 2 through transformer 3. Typically, power grid 2 is a three phase AC power source.

Power converter 110 is a power converter connected to power storage element 130 to perform power conversion between power storage element 130 and power grid 2. Specifically, power converter 110 converts a DC power output from power storage element 130 into an AC power and outputs the AC power to power grid 2 through transformer 3. Power converter 110 also converts an AC power from power grid 2 into a DC power and outputs the DC power to power storage element 130. Power converter 110 thus charges and discharge power of power storage element 130. Power converter 110 is, for example, a self-commutated converter such as a two-level converter, a three-level converter, or a modular multilevel converter. Power storage element 130 is, for example, an energy storage element such as an electric double layer capacitor or a secondary battery.

AC current detector 6a detects three phase AC current at interconnection point 4 between power grid 2 and power converter 110. Specifically, AC current detector 6a detects an a-phase AC current Isysa, a b-phase AC current Isysb, and a c-phase AC current Isysc flowing between transformer 3 and interconnection point 4. AC currents Isysa, Isysb, and Isysc (hereinafter also collectively referred to as "AC current Isys") are input to control device 100.

AC current detector 6b detects an AC current (hereinafter also simply referred to as "output current") output from power converter 110. Specifically, AC current detector 6b detects an a-phase output current Icna, a b-phase output current Icnb, and a c-phase output current Icnc flowing between transformer 3 and power converter 110. Output currents Icna, Icnb, and Icnc (hereinafter also collectively referred to as "output current Icn") are input to control device 100.

AC voltage detector 7 detects three phase AC voltage at interconnection point 4 of power grid 2. Specifically, AC voltage detector 7 detects an a-phase AC voltage Vsysa, a b-phase AC voltage Vsysb, and a c-phase AC voltage Vsysc at interconnection point 4. AC voltages Vsysa, Vsysb, and Vsysc (hereinafter also collectively referred to as "AC voltage Vsys") are input to control device 100.

DC current detector 8 detects a DC current Idc output from power storage element 130. DC current Idc is input to control device 100. It can be said that DC current Idc is DC current output from power converter 110.

DC voltage detector 9 detects a DC voltage Vdc output from power storage element 130. DC voltage Vdc is input to control device 100. It can be said that DC voltage Vdc is DC voltage output from power converter 110.

Control device 100 is a device that controls the operation of power converter 110. Specifically, control device 100 includes, as a main functional configuration, a command generating unit 101 and a signal generating unit 103. The functions of command generating unit 101 and signal generating unit 103 are implemented by a processing circuit. The processing circuit may be dedicated hardware or may be a CPU that executes a program stored in an internal memory of control device 100. When the processing circuit is dedicated hardware, the processing circuit is configured with, for example, an FPGA, an ASIC, or a combination thereof.

Command generating unit 101 mainly has a function of simulating the characteristics of a synchronous generator and a function of suppressing overcurrent and generates a phase θ of voltage output from power converter 110 and voltage command values (that is, voltage amplitude command values) Vdref and Vqref of the voltage. Specifically, command generating unit 101 generates phase θ of output voltage of power converter 110 by simulating the characteristics of a synchronous generator and generates such voltage command values Vdref and Vqref that suppress overcurrent. Voltage command value Vdref is a d-axis voltage command value, and voltage command value Vqref is a q-axis voltage command value.

Signal generating unit 103 generates a control signal for power converter 110, based on phase θ and voltage command values Vdref and Vqref (hereinafter also collectively referred to as "voltage command value Vref") generated by command generating unit 101 and outputs the generated control signal to power converter 110. Specifically, signal generating unit 103 includes a three phase voltage generating unit 105 and a pulse width modulation (PWM) control unit 107.

Three phase voltage generating unit 105 generates three phase sinusoidal voltages Va*, Vb*, and Vc* by two phase/three phase conversion, based on phase θ and AC voltage command values Vdref and Vqref.

PWM control unit 107 performs pulse width modulation for each of three phase sinusoidal voltages Va*, Vb*, and Vc* and generates a control signal as a PWM signal. PWM control unit 107 outputs the control signal to power converter 110. Typically, the control signal is a gate control signal for controlling the on/off of each switching element included in power converter 110.
<Hardware Configuration>

Figure 2:
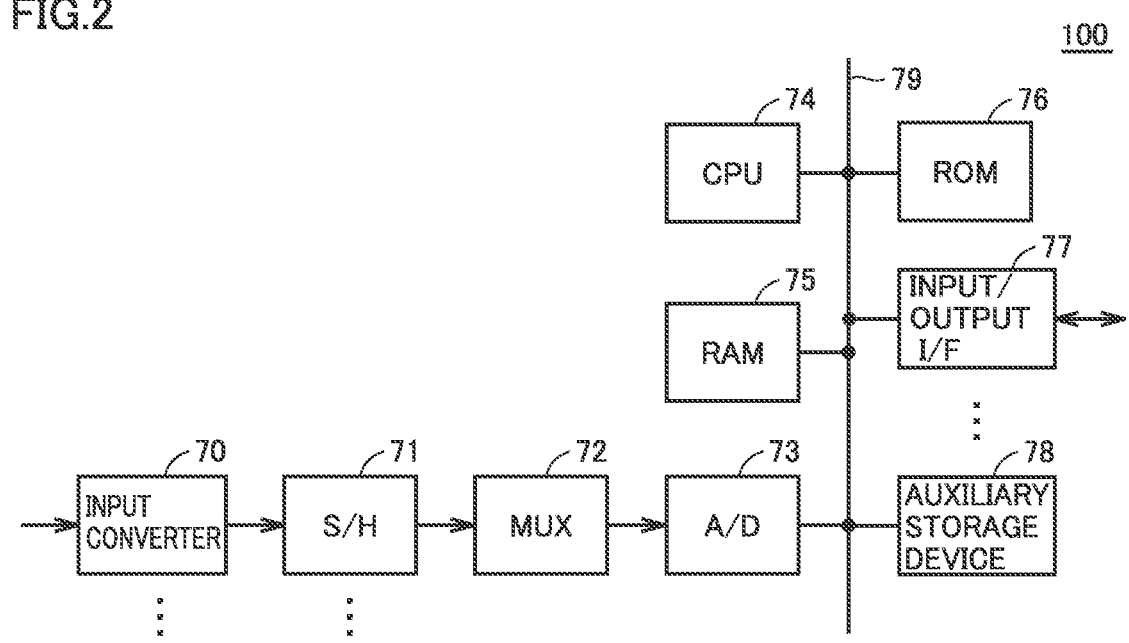
FIG. 2 is a diagram showing a hardware configuration example of a control device.

FIG. 2 is a diagram showing a hardware configuration example of control device 100. FIG. 2 shows an example in which control device 100 is configured with a computer.

Referring to FIG. 2, control device 100 includes one or more input converters 70, one or more sample and hold (S/H) circuits 71, a multiplexer 72, an A/D converter 73, one or more central processing units (CPU) 74, a random access memory (RAM) 75, a read only memory (ROM) 76, one or more input/output interfaces 77, and an auxiliary storage device 78. Control device 100 also includes a bus 79 connecting the components to each other.

Input converter 70 has an auxiliary transformer for each input channel. Each auxiliary transformer converts a detection signal by each detector in FIG. 1 into a signal with a voltage level suitable for the subsequent signal processing.

S/H circuit 71 is provided for each input converter 70. S/H circuit 71 samples and holds a signal indicating the electrical quantity received from the corresponding input converter 70 at a preset sampling frequency.

Multiplexer 72 sequentially selects signals held by a plurality of sample and hold circuits 71. A/D converter 73 converts a signal selected by multiplexer 72 into a digital value. A plurality of A/D converters 73 may be provided to perform A/D conversion for detection signals of a plurality of input channels in parallel.

CPU 74 controls the entire control device 100 and performs computational processing under instructions of a program. RAM 75 as a volatile memory and ROM 76 as a nonvolatile memory are used as a main memory of CPU 74. ROM 76 stores a program and setting values for signal processing. Auxiliary storage device 78 is a nonvolatile memory having a larger capacity than ROM 76 and stores a program and data such as electrical quantity detection values.

Input/output interface 77 is an interface circuit for communication between CPU 74 and an external device.

Unlike the example of FIG. 2, at least a part of control device 100 may be configured using circuitry such as a field programmable gate array (FPGA) and an application specific integrated circuit (ASIC).

<Configuration of Command Generating Unit>

Figure 3:
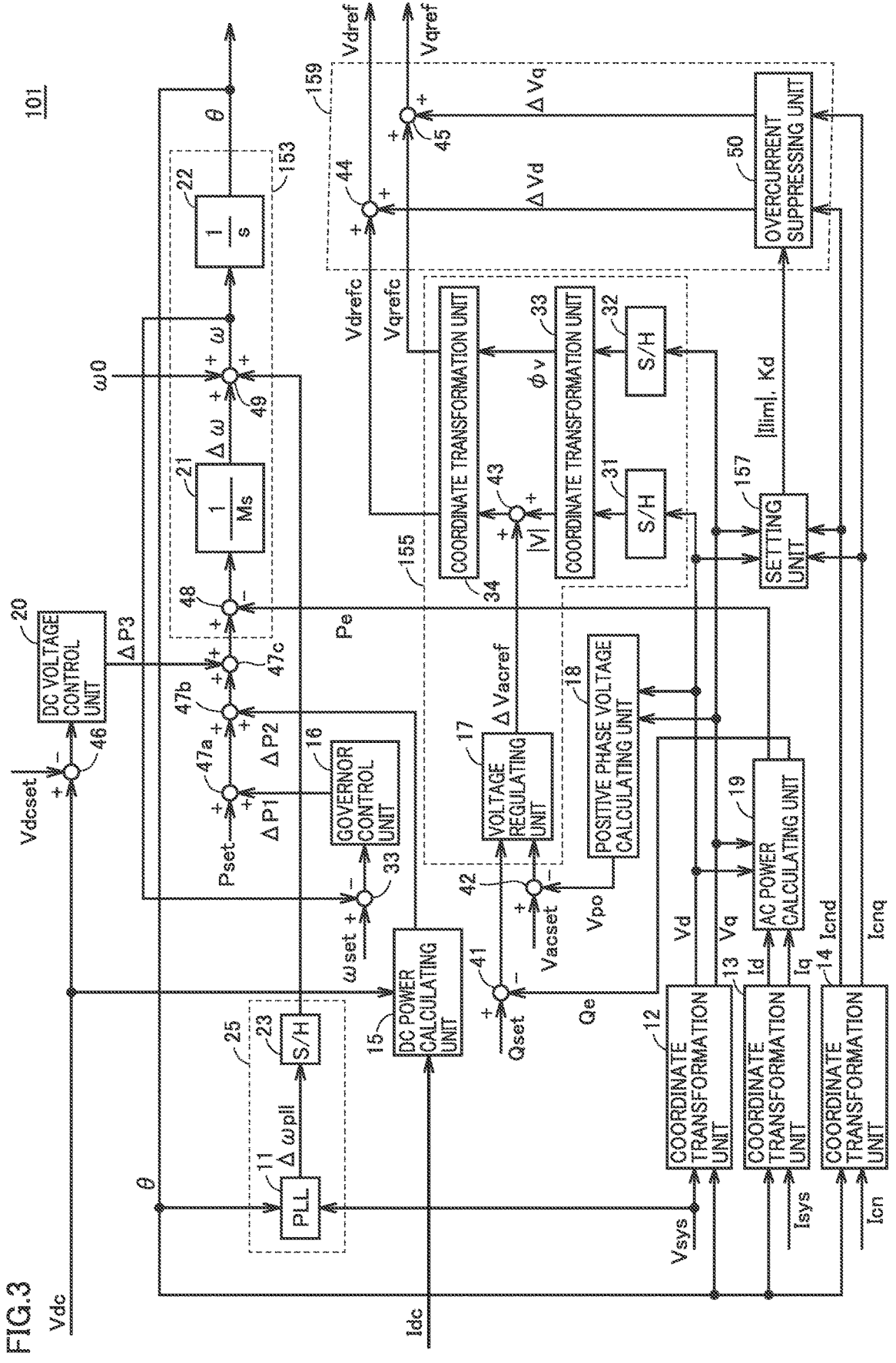
FIG. 3 is a block diagram showing an exemplary functional configuration of a command generating unit.

FIG. 3 is a block diagram showing an exemplary functional configuration of the command generating unit. Referring to FIG. 3, command generating unit 101 includes a generator simulating unit 153, voltage command generating units 155 and 159, a setting unit 157, a phase synchronizing unit 25, a governor control unit 16, a DC power calculating unit 15, and a DC voltage control unit 20. Command generating unit 101 further includes coordinate transformation units 12, 13, and 14, a positive phase voltage calculating unit 18, and an AC power calculating unit 19.

(Phase of Output Voltage)

The functional configuration related to generation of phase θ of output voltage of power converter 110 will be described.

Generator simulating unit 153 generates phase θ of output voltage of power converter 110 by simulating the characteristics of a synchronous generator.

Specifically, generator simulating unit 153 includes a subtractor 48, an integrator 21, an adder 49, and an integrator 22.

Subtractor 48 outputs a difference between an active power Pe at interconnection point 4 calculated by AC power calculating unit 19 and an active power target value Pset*. Active power target value Pset* is an addition value of an active power target value Pset, a correction amount ΔP1 output from governor control unit 16, a correction amount ΔP2 output from DC power calculating unit 15, and a correction amount ΔP3 output from DC voltage control unit 20. Specifically, adder 47a adds active power target value Pset and correction amount ΔP1. Adder 47b adds an output value of adder 47a and correction amount ΔP2. Adder 47c adds an output value of adder 47b and correction amount ΔP3. Active power target value Pset is set as appropriate by a grid operator.

Integrator 21 integrates an output value of subtractor 48 with respect to time and outputs an angular frequency deviation Δω. In FIG. 3, "M" in integrator 21 is the moment of inertia of the rotor of a synchronous generator (hereinafter also referred to as "virtual synchronous generator") to be simulated by generator simulating unit 153. Angular frequency deviation Δω output from integrator 21 corresponds to a difference between an angular frequency of the rotor in the virtual synchronous generator and a reference angular frequency ω0. Reference angular frequency ω0 is the angular frequency of a reference frequency (for example, 50 Hz or 60 Hz) of power in power grid 2.

Integrator 21 may integrate a value obtained by subtracting a multiplication value "D×Δω" of angular frequency deviation Δω and a damping coefficient D of the virtual synchronous generator from an output value of subtractor 48, with respect to time. In this way, the damping force of a synchronous generator is simulated in the control of power converter 110.

Adder 49 outputs a computed angular frequency by performing addition computation of angular frequency deviation Δω output from integrator 21 and reference angular frequency ω0. Specifically, adder 49 outputs an angular frequency ω (=Δω+ω0+Δωpll) by adding an angular frequency correction amount Δωpll output from phase synchronizing unit 25 to an addition value of angular frequency deviation Δω and reference angular frequency ω0. Integrator 22 generates phase θ of output voltage of power converter 110 by integrating angular frequency ω with respect to time.

Governor control unit 16 calculates a frequency adjustment amount corresponding to governor-free operation of the synchronous generator, based on the difference between a target angular frequency ω set and angular frequency ω, when the frequency of power grid 2 fluctuates, and outputs the frequency adjustment amount as correction amount ΔP1. Correction amount ΔP1 is added to active power target value Pset. Governor-free operation is operation for eliminating frequency fluctuation in a fluctuation period (for example, a few tens of seconds to a few minutes) by outputting such a frequency adjustment amount that absorbs fluctuation in frequency of the power grid.

DC power calculating unit 15 outputs a DC power value output from power storage element 130 as correction amount ΔP2, based on DC current Idc detected by DC current detector 8 and DC voltage Vdc detected by DC voltage detector 9. Correction amount ΔP2 is added to active power target value Pset.

DC voltage control unit 20 generates correction amount ΔP3 of active power for allowing DC voltage Vdc to follow DC voltage target value Vdcset. For example, DC voltage control unit 20 calculates correction amount ΔP3 by feedback control for reducing the deviation between DC voltage target value Vdcset and DC voltage Vdc to zero. Correction amount ΔP3 is added to active power target value Pset.

Phase synchronizing unit 25 calculates an angular frequency adjustment amount ωpll for synchronizing phase θ of output voltage of power converter 110 with phase θsys of AC voltage Vsys at start-up of power converter 110 (for example, when a control system of power converter 110 is turned on). Specifically, phase synchronizing unit 25 calculates angular frequency adjustment amount ωpll until power converter 110 transits from a gate blocking state to a deblocking state at start-up. Phase synchronizing unit 25 includes a PLL circuit 11 and a S/H circuit 23.

PLL circuit 11 calculates angular frequency adjustment amount Δωpll based on AC voltage Vsys and phase θ. Specifically, PLL circuit 11 calculates a d-axis voltage Vd and a q-axis voltage Vq by three phase/two phase conversion of AC voltages Vsysa, Vsysb, and Vsysc using phase θ. PLL circuit 11 calculates a phase difference Δθpll between phase θsys of AC voltage Vsys and phase θ, based on d-axis voltage Vd and q-axis voltage Vq. Typically, Δθpll is represented by arctan(Vd/Vq). PLL circuit 11 calculates angular frequency adjustment amount Δωpll based on phase difference Δθpll and a predetermined transfer function G. The initial value of phase θ is phase θ0 obtained by integrating reference angular frequency ω0 with respect to time.

When power converter 110 is in a gate blocking state, S/H circuit 23 outputs angular frequency adjustment amount Δωpll received from PLL circuit 11. On the other hand, when power converter 110 transits to a deblocking state, S/H circuit 23 outputs angular frequency adjustment amount Δωpll input from PLL circuit 11 immediately before. In other words, after transition to a deblocking state, angular frequency adjustment amount Δωpll is a fixed value.

For example, when a predetermined deblocking condition is satisfied, a higher-level device of power conversion device 120 transmits instruction information to transit power converter 110 to a deblocking state to control device 100. Control device 100 (for example, phase synchronizing unit 25) determines that power converter 110 has transited to a deblocking state when receiving the instruction information.

Alternatively, phase synchronizing unit 25 may determine that power converter 110 has transited to a deblocking state based on an instruction input from a grid operator. The deblocking condition includes a condition that phase θ is synchronized with phase θsys (for example, phase difference Δθpll is zero).

In the configuration of phase synchronizing unit 25 described above, angular frequency deviation Δωpll for synchronizing phase θ of output voltage of power converter 110 with phase θsys of AC voltage Vsys is calculated until power converter 110 transits from a gate blocking state to a deblocking state. Since angular frequency ω is corrected by adding angular frequency adjustment amount Δωpll to angular frequency deviation Δω and reference angular frequency ω0, phase θ can be synchronized with phase θsys quickly.

Then, when phase θ is synchronized with phase θsys to make a transition to a deblocking state, angular frequency adjustment amount Δωpll becomes a fixed value and therefore phase θ is controlled by fluctuation of angular frequency deviation Δω. In general, a PLL circuit has a time lag in control and is easily affected by sudden change of a grid voltage due to a grid fault or the like. In this case, current is unable to be suppressed appropriately, and a phenomenon similar to a loss of synchronization of a synchronous machine may be induced. In the present embodiment, the function of the PLL circuit is used to synchronize phase θ with phase θsys in a gate blocking state, but the function of the PLL circuit is not used after transition to a deblocking state, thereby preventing occurrence of the above phenomenon.

(Voltage Command Value of Output Voltage)

The functional configuration related to generation of a voltage command value (that is, voltage amplitude command value) of output voltage of power converter 110 will be described.

Coordinate transformation unit 12 calculates d-axis voltage Vd and q-axis voltage Vq by three phase/two phase conversion of AC voltages Vsysa, Vsysb, and Vsysc using phase θ. Coordinate transformation unit 13 calculates d-axis current Id and q-axis current Iq by three phase/two phase conversion of AC currents Isysa, Isysb, and Isysc using phase θ. Coordinate transformation unit 14 calculates d-axis current Icnd and q-axis current Icnq by three phase/two phase conversion of output currents Icna, Icnb, and Icnc using phase θ.

Positive phase voltage calculating unit 18 calculates a positive phase voltage Vpos based on d-axis voltage Vd and q-axis voltage Vq. AC power calculating unit 19 calculates active power Pe and reactive power Qe at interconnection point 4, based on d-axis voltage Vd, q-axis voltage Vq, d-axis current Id, and q-axis current Iq. Active power Pe is input to subtractor 48, and reactive power Qe is input to subtractor 41.

Subtractor 41 calculates a deviation ΔQ (=Qset−Qe) between reactive power target value Qset and reactive power Qe. Subtractor 42 calculates a deviation ΔVpos (=Vacset−Vpos) between grid voltage command value Vacset and positive phase voltage Vpos.

Voltage command generating unit 155 generates a voltage command value Vrefc of output voltage of power converter 110 so that AC voltage Vsys of power grid 2 becomes a target voltage or the reactive power of power grid 2 becomes a target reactive power. Voltage command value Vrefc includes a d-axis voltage command value Vdrefc and a q-axis voltage command value Vqrefc. Voltage command generating unit 155 includes a voltage regulating unit 17, S/H circuits 31 and 32, coordinate transformation units 33 and 34, and an adder 43.

Voltage regulating unit 17 selects one of an automatic reactive power regulation mode or an automatic voltage regulation mode and generates a voltage amplitude adjustment amount ΔVacref based on the selected mode. Specifically, when the automatic reactive power regulation mode is selected, voltage regulating unit 17 generates voltage amplitude adjustment amount ΔVacref by feedback control for reducing deviation ΔQ to zero. When the automatic voltage regulation mode is selected, voltage regulating unit 17 generates voltage amplitude adjustment amount ΔVacref by feedback control for reducing deviation ΔVpos to zero. Voltage regulating unit 17 is configured with a PI controller, a first-order lag element, or the like.

When power converter 110 is in a gate blocking state, S/H circuit 31 outputs d-axis voltage Vd received from coordinate transformation unit 12. On the other hand, when power converter 110 transits to a deblocking state, S/H circuit 31 outputs d-axis voltage Vd received from coordinate transformation unit 12 immediately before. That is, after transition to a deblocking state, d-axis voltage Vd is a fixed value. When power converter 110 is in a gate blocking state, S/H circuit 32 outputs q-axis voltage Vq received from coordinate transformation unit 12. On the other hand, when power converter 110 transits to a deblocking state, S/H circuit 32 outputs q-axis voltage Vq received from coordinate transformation unit 12 immediately before. In other words, after transition to a deblocking state, q-axis voltage Vq is a fixed value.

Coordinate transformation unit 33 converts d-axis voltage Vd and q-axis voltage Vq at interconnection point 4 into an amplitude |V| and a phase φv. Since d-axis voltage Vd and q-axis voltage Vq become fixed values immediately before a deblocking state, amplitude |V| and phase φv are also fixed. Adder 43 adds amplitude |V| and voltage amplitude adjustment amount ΔVacref. Coordinate transformation unit 34 performs dq-axis conversion of amplitude |V| and phase φv and generates d-axis voltage command value Vdrefc and q-axis voltage command value Vqrefc.

(Overcurrent Suppression)

The functional configuration related to suppression of overcurrent of power converter 110 will be described.

Setting unit 157 sets an overcurrent level of output current of power converter 110, based on at least one of the output current and AC voltage Vsys of power grid 2. The setting method of setting unit 157 will be described later.

Voltage command generating unit 159 generates voltage command value Vref of output voltage of power converter 110 by limiting voltage command value Vrefc generated by voltage command generating unit 155, based on the overcurrent level set by setting unit 157. Voltage command generating unit 159 includes an overcurrent suppressing unit 50 and adders 44 and 45.

Figure 4:
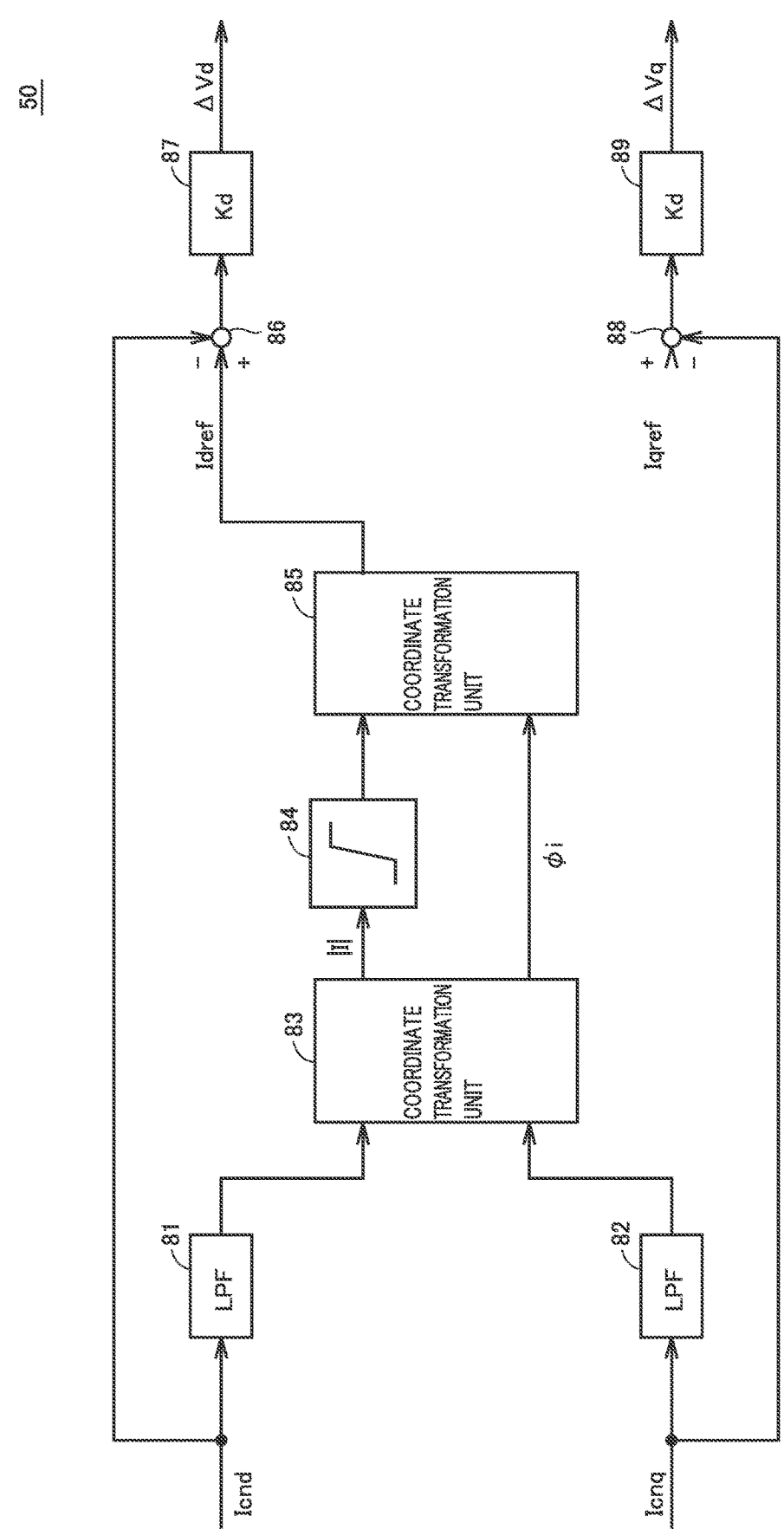
FIG. 4 is a block diagram showing an exemplary functional configuration of an overcurrent suppressing unit.

FIG. 4 is a block diagram showing an exemplary functional configuration of overcurrent suppressing unit 50. Overcurrent suppressing unit 50 includes low-pass filters 81 and 82, coordinate transformation units 83 and 85, a limiter 84, subtractors 86 and 88, and proportional elements 87 and 89.

Low-pass filter 81 extracts a fundamental frequency component Icnfd of d-axis current Icnd. Low-pass filter 82 extracts a fundamental frequency component Icnfq of q-axis current Icnq. Coordinate transformation unit 83 converts fundamental frequency component Icnfd and fundamental frequency component Icnfq into an amplitude |I| and a phase di of the fundamental frequency component.

Limiter 84 limits the amplitude |I| of the fundamental frequency component, using a limit value |Imax| corresponding to the overcurrent level set by setting unit 157. Specifically, limiter 84 limits the amplitude |I| to within a range in accordance with limit value |Imax| (lower limit: −Imax, upper limit: +Imax).

Coordinate transformation unit 85 generates a d-axis current command value Idref and a q-axis current command value Iqref by performing dq conversion of amplitude |I| and phase di output from limiter 84. Subtractor 86 outputs a deviation ΔId (=Idref-Icnd) between d-axis current command value Idref and d-axis current Icnd. Subtractor 88 outputs a deviation ΔIq (=Iqref-Icnq) between q-axis current command value Iqref and q-axis current Icnq.

D-axis current command value Idref and q-axis current command value Iqref have amplitudes limited by limiter 84. Therefore, Icnd>Idref and Icnq>Iqref, and deviation ΔId and deviation ΔIq are negative.

Proportional element 87 calculates a d-axis voltage suppression amount ΔVd as a multiplication value of deviation ΔId and a gain Kd (where Kd≥0) corresponding to the overcurrent level set by setting unit 157. Proportional element 89 calculates a q-axis voltage suppression amount ΔVq as a multiplication value of deviation ΔIq and a gain Kd corresponding to the overcurrent level. Here, ΔVd≤0 and ΔVq≤0.

Referring to FIG. 3 again, adder 44 generates d-axis voltage command value Vdref by adding d-axis voltage command value Vdrefc and d-axis voltage suppression amount ΔVd. Adder 45 generates q-axis voltage command value Vqref by adding q-axis voltage command value Vqrefc and q-axis voltage suppression amount ΔVq.

As described above, such a voltage command value Vref that suppresses overcurrent of output current of power converter 110 is generated using d-axis voltage suppression amount ΔVd and q-axis voltage suppression amount ΔVq generated by overcurrent suppressing unit 50.

It is understood that the configuration of overcurrent suppressing unit 50 in FIG. 4 can adjust the suppression amount of overcurrent in accordance with limit value |Imax| and the value of gain Kd. Setting unit 157 sets an overcurrent level and outputs limit value |Imax| and gain Kd corresponding to the set overcurrent level to overcurrent suppressing unit 50.

FIG. 5 is a diagram showing examples of a limit value and a gain corresponding to an overcurrent level. Referring to FIG. 5, the overcurrent level indicates an overcurrent state in output current of power converter 110. The larger the number N is, the greater the degree of overcurrent is. Therefore, when the overcurrent level is larger (that is, the number N is larger), greater overcurrent suppression is necessary. Specifically, overcurrent levels are levels 1a, 1b (hereinafter also collectively referred to as "level 1"), level 2, level 3, . . . , level N in the increasing order. Level 1 is a level indicating that overcurrent does not occur in power converter 110 (that is, output current of power converter 110 is not overcurrent). Level 2 is a level greater than level 1 and indicating that overcurrent is occurring in power converter 110. Level 3 is greater than level 2 and indicates that overcurrent larger than overcurrent in level 2 is occurring in power converter 110. Level N is greater than level (N−1) and indicates that overcurrent larger than overcurrent in level (N−1) is occurring in power converter 110.

Both level 1a and level 1b are a level indicating that overcurrent is not occurring in power converter 110 but distinguished from each other in view of whether a harmonic component is suppressed or not. Specifically, level 1a is a level in which a harmonic component is not suppressed, and level 1b is a level in which a harmonic component is suppressed. Typically, setting unit 157 selects one of level 1a and level 1b based on an instruction from a grid operator.

Alternatively, setting unit 157 may select level 1b when a harmonic component of power grid 2 is detected and select level 1a when the harmonic component is not detected. In this case, command generating unit 101 has a function (for example, harmonic detecting unit) of detecting a harmonic component included in AC voltage Vsys or AC current Isys. The harmonic detecting unit calculates a fundamental component for the frequency of AC voltage Vsys and a harmonic component of a predetermined order (for example, third order). Fast Fourier transform, discrete Fourier transform, and the like are known as a calculation method of the fundamental component of AC voltage Vsys and the harmonic voltage. The harmonic detecting unit may calculate a harmonic component of AC current Isys. The harmonic detecting unit determines that a harmonic has been detected when the magnitude (for example, amplitude) of the calculated harmonic component is equal to or greater than a reference value, and determines that a harmonic is not detected when the magnitude of the harmonic component is smaller than a reference value.

When the overcurrent level is "level 1a", the limit value is "|Imax1a|" and gain Kd is "Kd1a". Similarly, limit value |Imax| and gain Kd corresponding to level 1b are |Imax1b| and Kd1b, respectively, limit value |Imax| and gain Kd corresponding to level 2 are |Imax2| and Kd2, respectively, limit value |Imax| and gain Kd corresponding to level 3 are |Imax3| and Kd3, respectively, and limit value | Imax| and gain Kd corresponding to level N are |ImaxN| and KdN, respectively.

The greater the overcurrent level, the smaller the limit value |Imax|, and the greater the overcurrent level, the larger gain Kd. Specifically, |Imax1a|=|Imax1b|, and |Imax1a|>|Imax2|>|Imax3|> . . . >|ImaxN|. Further, Kd1a>Kd1b>Kd2>Kd3> . . . >KdN.

FIG. 6 is a diagram illustrating an example of a method of setting an overcurrent level. Referring to FIG. 6, setting unit 157 sets an overcurrent level, based on at least one of the comparison result between the magnitude (for example, amplitude) of output current Icn of power converter 110 and a current threshold, and the comparison result between the magnitude (for example, amplitude) of AC voltage Vsys and a voltage threshold. In the following description, the magnitude of output current Ion is also denoted as |Icn|, and the magnitude of AC voltage Vsys is also denoted as |Vsys|. |Vsys| corresponds to the amplitude of positive phase voltage Vpos of AC voltage Vsys.

Setting unit 157 sets an overcurrent level for each of predetermined control periods. To increase an overcurrent level, setting unit 157 sets an overcurrent level using at least one of current threshold Iup and voltage threshold Vup in "at a time of level increase" in FIG. 6. Current threshold Iup includes current values 11, 12, 13, ..., IN. Voltage threshold Vup includes voltage values V1, V2, V3, ..., VN. On the other hand, to decrease an overcurrent level, setting unit 157 sets an overcurrent level using at least one of current threshold Idown and voltage threshold Vdown in "at a time of level decrease" in FIG. 6. Current threshold Idown includes current values (I1-Ig), (I2-Ig), (I3-Ig), ..., (IN-Ig). Voltage threshold Vdown includes voltage values (V1+Vg), (V2+Vg), (V3+Vg), ..., (VN+Vg).

For current threshold Iup and voltage threshold Vup at a time of level increase, I1<12<...<IN, and V1>V2>...>VN. For current threshold Idown and voltage threshold Vdown at a time of level decrease, I1-Ig<12-Ig<...<IN-Ig, and V1+Vg>V2+Vg>...>VN+Vg. Ig and Vg indicate a dead band width.

The setting method of setting unit 157 includes a setting method X1 of setting an overcurrent level based on output current Icn, a setting method X2 of setting an overcurrent level based on AC voltage Vsys, and a setting method X3 of setting an overcurrent level based on output current Icn and AC voltage Vsys.

The setting method X1 will be described. It is assumed that the overcurrent level at present is set to level 1. When |Icn| is smaller than I1, setting unit 157 sets the overcurrent level to level 1 (that is, keeps level 1). When |Icn| becomes I1 or greater and smaller than 12, setting unit 157 sets the overcurrent level to level 2 (that is, switches the overcurrent level from level 1 to level 2). When |Icn| becomes 12 or greater and smaller than 13, setting unit 157 sets the overcurrent level to level 3. When |Icn| becomes I(N−1) or greater, setting unit 157 sets the overcurrent level to level N.

On the other hand, it is assumed that the overcurrent level at present is set to level N (where N=4 or larger). When |Icn| becomes smaller than (I1-Ig), setting unit 157 sets the overcurrent level to level 1 (that is, switches the overcurrent level from level N to level 1). When |Icn| becomes (I1-Ig) or greater and smaller than (I2-Ig), setting unit 157 sets the overcurrent level to level 2. When |Icn| becomes (I2-Ig) or greater and smaller than (I3-Ig), setting unit 157 sets the overcurrent level to level 3. When |Icn| is {I(N−1)−Ig} or greater, setting unit 157 sets the overcurrent level to level N (that is, keeps level N). As another specific example, assuming that the overcurrent level is set to level 2 or level 3, when |Icn| becomes smaller than (I1-Ig), setting unit 157 sets the overcurrent level to level 1.

In this way, when |Icn| becomes a value smaller than current threshold Iup by dead band width Ig, setting unit 157 decreases the overcurrent level and relaxes or clears overcurrent suppression. This avoids a situation in which the overcurrent level is unstable (for example, to cause a hunting phenomenon) in the vicinity of current threshold Iup.

The setting method X2 will now be described. It is assumed that the overcurrent level at present is set to level 1. In this case, when |Vsys| is greater than V1, setting unit 157 sets the overcurrent level to level 1. When |Vsys| becomes V1 or smaller and greater than V2, setting unit 157 sets the overcurrent level to level 2. When |Vsys| becomes V2 or smaller and greater than V3, setting unit 157 sets the overcurrent level to level 3. When |Vsys| becomes V(N−1) or smaller, setting unit 157 sets the overcurrent level to level N.

On the other hand, it is assumed that the overcurrent level at present is set to level N (where N=4 or larger). When |Vsys| becomes greater than (V1+Vg), setting unit 157 sets the overcurrent level to level 1. When |Vsys| becomes (V1+Vg) or smaller and greater than (V2+Vg), setting unit 157 sets the overcurrent level to level 2. When |Vsys| becomes (V2+Vg) or smaller and greater than (V3+Vg), setting unit 157 sets the overcurrent level to level 3. When |Vsys| is {V(N−1)+Vg} or smaller, setting unit 157 sets the overcurrent level to level N. Using the dead band width Vg can avoid a situation in which the overcurrent level is unstable in the vicinity of the boundary of voltage threshold Vup, in the same manner as in the setting method X1.

The setting method X3 will now be described. The setting method X3 is a setting method in which the setting method X1 and the setting method X2 are combined. Specifically, setting unit 157 sets a greater level of overcurrent level 11 set based on output current Icn using the setting method X1 and overcurrent level L2 set based on AC voltage Vsys using the setting method X2, as the final overcurrent level. For example, it is assumed that setting unit 157 sets overcurrent level L1 to "level 1" using the setting method X1 and sets overcurrent level L2 to "level 2" using the setting method X2. In this case, setting unit 157 sets the final overcurrent level to "level 2". As a result, appropriate overcurrent suppression can be performed in terms of both output current and AC voltage.

Here, a specific example of limit value |Imax|, gain Kd, the current threshold, and the voltage threshold when N=4 will be described. In the following description, it is assumed that the rated current value of output current Ion is 1 [pu], and the rated voltage value of AC voltage Vsys is 1 [pu].

In this case, for example, |Imax1a|=1, |Imax1b|=1, |Imax2|=0.5, |Imax2|=0.25, |Imax3|=0. Kd1a=0, Kd1b=0.5, Kd2-0.75, Kd3=0.9, Kd4=1.

Further, for current threshold Iup, 11=1.2, 12=1.3, 13=1.4. For current threshold Idown, Ig=0.05, and I1-Ig=1.15, 12-Ig=1.25, 13-Ig=1.35. For voltage threshold Vup, V1=0.7, V2=0.5, V3=0.3. For voltage threshold Vdown, Vg=0.1, and V1+Vg=0.8, V2+Vg=0.6, V3+Vg=0.4.

It is assumed that the overcurrent level is set to level 1 and the setting method X1 is used. When |Icn| is smaller than 1.2 pu, setting unit 157 keeps the overcurrent level at level 1. Setting unit 157 sets the overcurrent level to level 2 when |Icn| is 1.2 pu or greater and smaller than 1.3 pu, sets the overcurrent level to level 3 when |Icn| is 1.3 pu or greater and smaller than 1.4 pu, and sets the overcurrent level to level 4 when |Icn| becomes 1.4 pu or greater.

It is assumed that the overcurrent level is set to level 4 and the setting method X1 is used. Setting unit 157 sets the overcurrent level to level 1 when |Icn| is smaller than 1.15, sets the overcurrent level to level 2 when |Icn| is 1.15 pu or greater and smaller than 1.25 pu, and sets the overcurrent level to level 3 when |Icn| becomes 1.25 pu or greater and smaller than 1.35 pu. Setting unit 157 keeps the overcurrent level at level 4 when |Icn| is 1.35 pu or greater.

Setting unit 157 outputs limit value |Imax| and gain Kd corresponding to each level to overcurrent suppressing unit 50. Overcurrent suppressing unit 50 performs the above process in accordance with limit value |Imax| and gain Kd.

<Advantages>

According to the present embodiment, since the limit value and the gain are set as appropriate in accordance with an overcurrent state of power converter 110, overcurrent suppression appropriate for the overcurrent state can be performed. Accordingly, overcurrent suppression can be performed flexibly while performing control of simulating a synchronous generator for a power converter.

Other Embodiments (1) In the foregoing embodiments, a configuration in which dead band widths Ig and Vg are provided has been described. However, embodiments are not limited to this configuration and the dead band widths Ig and Vg are not necessarily provided.

(2) The above configurations described as embodiments are examples of the configuration of the present disclosure, can be combined with other known techniques, and are susceptible to modifications such as partial omission without departing from the spirit of the present disclosure. In the foregoing embodiments, the processing and configuration described in other embodiments may be employed and carried out, if necessary.

Embodiments disclosed here should be understood as being illustrative rather than being limitative in all respects. The scope of the present disclosure is shown not in the foregoing description but in the claims, and it is intended that all modifications that come within the meaning and range of equivalence to the claims are embraced here.

REFERENCE SIGNS LIST

2 power grid, 3 transformer, 4 interconnection point, 6a, 6b AC current detector, 7 AC voltage detector, 8 DC current detector, 9 DC voltage detector, 11 PLL circuit, 15 DC power calculating unit, 16 governor control unit, 17 voltage regulating unit, 18 positive phase voltage calculating unit, 19 AC power calculating unit, 20 DC voltage control unit, 25 phase synchronizing unit, 50 overcurrent suppressing unit, 70 input converter, 71 sample and hold circuit, 72 multiplexer, 73 A/D converter, 74 CPU, 75 RAM, 76 ROM, 77 input/output interface, 78 auxiliary storage device, 79 bus, 81, 82 low-pass filter, 84 limiter, 87, 89 proportional element, 100 control device, 101 command generating unit, 103 signal generating unit, 105 three phase voltage generating unit, 107 PWM control unit, 110 power converter, 120 power conversion device, 130 power storage element, 153 generator simulating unit, 155, 159 voltage command generating unit, 157 setting unit, 1000 power conversion system.

The invention claimed is:

1. A control device for a power converter to perform power conversion between a power storage element and a power grid, the control device comprising:
a generator simulating unit to generate a phase of output voltage of the power converter by simulating characteristics of a synchronous generator;
a first voltage command generating unit to generate a first voltage command value of output voltage of the power converter so that an AC voltage of the power grid attains a target voltage or so that a reactive power of the power grid attains a target reactive power;
a setting unit to set an overcurrent level of an output current of the power converter, based on at least one of the output current and the AC voltage of the power grid;
a second voltage command generating unit to generate a second voltage command value of output voltage of the power converter by limiting the first voltage command value based on the overcurrent level,
the second voltage command generating unit including
a filter to extract a fundamental frequency component of the output current,
a limiter to limit an amplitude of the fundamental frequency component, using a limit value corresponding to the overcurrent level,
a first calculating unit to calculate a multiplication value of a deviation between an output value of the limiter and the output current and a gain corresponding to the overcurrent level, and
a second calculating unit to calculate the second voltage command value by adding the first voltage command value and the multiplication value; and
a signal generating unit to generate a control signal for the power converter, based on the phase generated by the generator simulating unit and the second voltage command value.

2. The control device according to claim 1, wherein the overcurrent level includes a first level indicating that overcurrent is not occurring in the power converter, a second level greater than the first level and indicating that overcurrent is occurring in the power converter, and a third level greater than the second level and indicating that overcurrent larger than overcurrent in the second level is occurring in the power converter, as the overcurrent level increases, the limit value decreases, and
as the overcurrent level increases, the gain increases.

3. The control device according to claim 2, wherein the setting unit
sets the overcurrent level to the first level when the output current is smaller than a first current value,
sets the overcurrent level to the second level when the output current is the first current value or greater and smaller than a second current value, and
sets the overcurrent level to the third level when the output current is the second current value or greater and smaller than a third current value.

4. The control device according to claim 3, wherein when the overcurrent level is set to the second level or the third level, the setting unit sets the overcurrent level to the first level when the output current becomes a value smaller than the first current value by a preset value.

5. The control device according to claim 4, wherein the generator simulating unit includes
a first integrator to output a first angular frequency by integrating a difference between an active power calculated based on an AC current and the AC voltage of the power grid and an active power target value with respect to time,
an adder to perform addition computation of the first angular frequency and a reference angular frequency, and
a second integrator to output a phase of output voltage of the power converter by integrating a computed angular frequency output from the adder with respect to time.

6. The control device according to claim 3, wherein the generator simulating unit includes a first integrator to output a first angular frequency by integrating a difference between an active power calculated based on an AC current and the AC voltage of the power grid and an active power target value with respect to time, an adder to perform addition computation of the first angular frequency and a reference angular frequency, and a second integrator to output a phase of output voltage of the power converter by integrating a computed angular frequency output from the adder with respect to time.

7. The control device according to claim 2, wherein the setting unit sets the overcurrent level to the first level when the AC voltage is greater than a first voltage value, sets the overcurrent level to the second level when the AC voltage is the first voltage value or smaller and greater than a second voltage value, and sets the overcurrent level to the third level when the AC voltage is the second voltage value or smaller and greater than a third voltage value.

8. The control device according to claim 7, wherein the generator simulating unit includes a first integrator to output a first angular frequency by integrating a difference between an active power calculated based on an AC current and the AC voltage of the power grid and an active power target value with respect to time, an adder to perform addition computation of the first angular frequency and a reference angular frequency, and a second integrator to output a phase of output voltage of the power converter by integrating a computed angular frequency output from the adder with respect to time.

9. The control device according to claim 2, wherein the setting unit sets a first overcurrent level including the first to third levels, based on the output current, sets a second overcurrent level including the first to third levels, based on the AC voltage, and sets a greater level of the first overcurrent level and the second overcurrent level as the overcurrent level.

10. The control device according to claim 9, wherein the setting unit sets the first overcurrent level to the first level when the output current is smaller than a first current value, sets the first overcurrent level to the second level when the output current is the first current value or greater and smaller than a second current value, and sets the first overcurrent level to the third level when the output current is the second current value or greater and smaller than a third current value, sets the second overcurrent level to the first level when the AC voltage is greater than a first voltage value, sets the second overcurrent level to the second level when the AC voltage is the first voltage value or smaller and greater than a second voltage value, and sets the second overcurrent level to the third level when the AC voltage is the second voltage value or smaller and greater than a third voltage value.

11. The control device according to claim 10, wherein the generator simulating unit includes a first integrator to output a first angular frequency by integrating a difference between an active power calculated based on an AC current and the AC voltage of the power grid and an active power target value with respect to time, an adder to perform addition computation of the first angular frequency and a reference angular frequency, and a second integrator to output a phase of output voltage of the power converter by integrating a computed angular frequency output from the adder with respect to time.

12. The control device according to claim 9, wherein the generator simulating unit includes a first integrator to output a first angular frequency by integrating a difference between an active power calculated based on an AC current and the AC voltage of the power grid and an active power target value with respect to time, an adder to perform addition computation of the first angular frequency and a reference angular frequency, and a second integrator to output a phase of output voltage of the power converter by integrating a computed angular frequency output from the adder with respect to time.

13. The control device according to claim 2, wherein the generator simulating unit includes a first integrator to output a first angular frequency by integrating a difference between an active power calculated based on an AC current and the AC voltage of the power grid and an active power target value with respect to time, an adder to perform addition computation of the first angular frequency and a reference angular frequency, and a second integrator to output a phase of output voltage of the power converter by integrating a computed angular frequency output from the adder with respect to time.

14. The control device according to claim 1, wherein the generator simulating unit includes a first integrator to output a first angular frequency by integrating a difference between an active power calculated based on an AC current and the AC voltage of the power grid and an active power target value with respect to time, an adder to perform addition computation of the first angular frequency and a reference angular frequency, and a second integrator to output a phase of output voltage of the power converter by integrating a computed angular frequency output from the adder with respect to time.

15. The control device according to claim 14, further comprising a governor control unit to calculate a frequency adjustment amount corresponding to governor-free operation of the synchronous generator, based on a difference between a target angular frequency and the computed angular frequency, wherein the frequency adjustment amount is added to the active power target value.

16. The control device according to claim 15, further comprising a DC power calculating unit to calculate a DC power value output from the power storage element, wherein the DC power value is added to the active power target value.

17. The control device according to claim 14, further comprising a DC power calculating unit to calculate a DC power value output from the power storage element, wherein the DC power value is added to the active power target value.

18. The control device according to claim 14, further comprising a DC voltage control unit to calculate an active power correction value for allowing a DC voltage of the power storage element to follow a DC voltage target value, wherein the active power correction value is added to the active power target value.

19. The control device according to claim 14, further comprising a phase synchronizing unit to calculate an angular frequency adjustment amount for synchronizing a phase of output voltage of the power converter with a phase of the AC voltage at start-up of the power converter, wherein the adder adds the angular frequency adjustment amount to an addition value of the first angular frequency and a reference angular frequency and outputs the computed angular frequency.

20. A power conversion device comprising:

a power converter to perform power conversion between a power storage element and a power grid; and a control device for the power converter, the control device including a generator simulating unit to generate a phase of output voltage of the power converter by simulating characteristics of a synchronous generator, a first voltage command generating unit to generate a first voltage command value of output voltage of the power converter so that an AC voltage of the power grid attains a target voltage or so that a reactive power of the power grid attains a target reactive power, a setting unit to set an overcurrent level of an output current of the power converter, based on at least one of the output current and the AC voltage of the power grid, and a second voltage command generating unit to generate a second voltage command value of output voltage of the power converter by limiting the first voltage command value based on the overcurrent level, the second voltage command generating unit including a filter to extract a fundamental frequency component of the output current, a limiter to limit an amplitude of the fundamental frequency component, using a limit value corresponding to the overcurrent level, a first calculating unit to calculate a multiplication value of a deviation between an output value of the limiter and the output current and a gain corresponding to the overcurrent level, and a second calculating unit to calculate the second voltage command value by adding the first voltage command value and the multiplication value, the control device further including a signal generating unit to generate a control signal for the power converter, based on the phase generated by the generator simulating unit and the second voltage command value.

* * * * *